United States Patent
Park et al.

(10) Patent No.: US 12,443,679 B2
(45) Date of Patent: Oct. 14, 2025

(54) IMAGE PROCESSING DEVICE FOR IMPROVING DETAILS OF AN IMAGE, AND OPERATION METHOD OF THE SAME

(71) Applicant: SAMSUNG ELECTRONICS CO., LTD., Suwon-si (KR)

(72) Inventors: Jaeyeon Park, Suwon-si (KR); Iljun Ahn, Suwon-si (KR); Yongsup Park, Suwon-si (KR); Jaehee Kwak, Suwon-si (KR); Tammy Lee, Suwon-si (KR); Minsu Cheon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/427,442

(22) Filed: Jan. 30, 2024

(65) Prior Publication Data

US 2024/0169031 A1    May 23, 2024

Related U.S. Application Data

(63) Continuation of application No. 17/299,607, filed as application No. PCT/KR2019/013588 on Oct. 16, 2019, now Pat. No. 11,921,822.

(30) Foreign Application Priority Data

Dec. 4, 2018    (KR) .................. 10-2018-0154691

(51) Int. Cl.
*G06F 18/22*    (2023.01)
*G06N 3/04*    (2023.01)
(Continued)

(52) U.S. Cl.
CPC .............. *G06F 18/22* (2023.01); *G06N 3/04* (2013.01); *G06T 7/11* (2017.01); *G06V 10/40* (2022.01); *G06V 10/759* (2022.01)

(58) Field of Classification Search
CPC .......... G06F 18/22; G06N 3/04; G06N 3/045; G06T 7/11; G06T 1/20; G06T 5/20;
(Continued)

(56) References Cited

U.S. PATENT DOCUMENTS

| 8,285,068 B2 | 10/2012 | Schoenblum |
| 9,008,423 B2 * | 4/2015 | Cho ........................ G06V 20/52 382/168 |

(Continued)

FOREIGN PATENT DOCUMENTS

| JP | 2009289078 A | 12/2009 |
| JP | 2017156886 A | 9/2017 |

(Continued)

OTHER PUBLICATIONS

Communication dated Oct. 21, 2024, issued by the Korean Intellectual Property Office in Korean Application No. 10-2018-0154691.

(Continued)

*Primary Examiner* — Mia M Thomas
(74) *Attorney, Agent, or Firm* — Sughrue Mion, PLLC

(57) ABSTRACT

Provided are an image processing apparatus and an operation method of the image processing apparatus. The image processing apparatus includes a memory storing one or more instructions, and a processor configured to execute the one or more instructions stored in the memory to, by using one or more convolution neural networks, extract target features by performing a convolution operation between features of target regions having same locations in a plurality of input images and a first kernel set, extract peripheral features by performing a convolution operation of features of peripheral regions located around the target regions in the plurality of input images and a second kernel set, and determine a feature of a region corresponding to the target regions in an (Continued)

output image, based on the target features and the peripheral features.

17 Claims, 11 Drawing Sheets

(51) Int. Cl.
*G06T 7/11* (2017.01)
*G06V 10/40* (2022.01)
*G06V 10/75* (2022.01)

(58) Field of Classification Search
CPC .......... G06T 2207/20084; G06V 10/40; G06V 10/759; G06V 10/82
See application file for complete search history.

(56) References Cited

U.S. PATENT DOCUMENTS

| | | | | |
|---|---|---|---|---|
| 9,330,442 | B2* | 5/2016 | Kang | G06T 5/70 |
| 10,846,826 | B2* | 11/2020 | Myokan | G06T 1/00 |
| 11,354,888 | B2* | 6/2022 | Wang | G06N 3/08 |
| 11,676,361 | B2* | 6/2023 | Sakai | G06T 5/50 |
| | | | | 382/173 |
| 2016/0269713 | A1* | 9/2016 | Kasumi | G06T 7/11 |
| 2016/0357406 | A1 | 12/2016 | Lee et al. | |
| 2017/0154420 | A1 | 6/2017 | Barnes et al. | |
| 2018/0136720 | A1* | 5/2018 | Spitzer | G06T 1/20 |
| 2020/0012876 | A1 | 1/2020 | Liu | |
| 2020/0160125 | A1* | 5/2020 | Wang | G06F 18/2413 |
| 2020/0242353 | A1 | 7/2020 | Zhang | |
| 2021/0174768 | A1* | 6/2021 | Jarvenpaa | G06F 3/013 |
| 2021/0390355 | A1* | 12/2021 | Xu | G06F 18/214 |
| 2022/0019844 | A1* | 1/2022 | Park | G06N 3/04 |
| 2022/0138924 | A1 | 5/2022 | Kwon et al. | |
| 2022/0351491 | A1* | 11/2022 | Zhou | G06V 40/172 |
| 2023/0196838 | A1* | 6/2023 | Lei | G06V 10/7715 |
| | | | | 348/77 |

FOREIGN PATENT DOCUMENTS

| | | |
|---|---|---|
| KR | 102014090777 A | 7/2014 |
| KR | 1020150037369 A | 4/2015 |
| KR | 1020180097944 A | 9/2018 |

OTHER PUBLICATIONS

Dabov, K., et al., "BM3D Image enoising with Shape-Adaptive Principal Component Analysis", Mar. 2009, http://www.cs.tut.fi/foi/GCF-BM3D, 6 pages.

Glasner, D., et al., "Super-Resolution from a Single Image", IEEE 12th International Conference on Computer Vision (ICCV), 2009, pp. 349-356.

International Search Report (PCT/ISA/210) dated Jan. 23, 2020 issued by the International Searching Authority in International Application No. PCT/KR2019/013588.

Ledig, C., et al., "Photo-Realistic Single Image Super-Resolution Using a Generative Adversarial Network", arXiv:1609.04802v4 [cs.CV], Apr. 13, 2017, 19 pages.

* cited by examiner

IMAGE PROCESSING DEVICE FOR IMPROVING DETAILS OF AN IMAGE, AND OPERATION METHOD OF THE SAME

CROSS REFERENCE TO RELATED APPLICATIONS

This is a Continuation Application of U.S. application Ser. No. 17/299,607 filed Jun. 3, 2021, which is a National Stage of International Application No. PCT/KR2019/013588 filed Oct. 16, 2019, which is based on and claims priority to Korean Patent Application No. 10-2018-0154691, filed on Dec. 4, 2018, in the Korean Intellectual Property Office, the disclosures of which are incorporated by reference herein in their entireties.

TECHNICAL FIELD

The disclosure relates to image processing apparatuses and methods of performing a convolution operation, and more particularly, to an image processing apparatus capable of improving details of an image during execution of a convolution operation, and an operation method of the image processing apparatus.

BACKGROUND ART

With the development of computer technology, data traffic has increased exponentially, and artificial intelligence (AI) has become an important trend driving future innovation. Because AI emulates the way people think, it can be practically applied in infinite ways to all industries. Representative AI technologies include pattern recognition, machine learning, an expert system, a neural network, and natural language processing.

The neural network models characteristics of human biological neurons by using mathematical expressions, and uses an algorithm that emulates the human ability called learning. Through this algorithm, the neural network is able to generate mapping between input data and output data, and the capability of generating such mapping may be called learning capability of the neural network. Also, the neural network has generalization capability of generating correct output data with respect to input data that is not used for learning, based on learned results.

In a convolution neural network (CNN) and the like, an output image is generated through a convolution operation between input images (input feature maps) and a kernel. At this time, the output image is generated by referring to the features of corresponding regions on the input images (regions having the same locations on the input images). Accordingly, when details of a specific region on an input image are lost, it is difficult to generate details of a region corresponding to the specific region within the output image.

DESCRIPTION OF EMBODIMENTS

Technical Problem

Provided are an image processing apparatus capable of improving the details of a region corresponding to a target region within an output image by generating the output image by using a target feature of a target region included in an input image and a peripheral feature of a peripheral region located around the target region, and an operation method of the image processing apparatus.

Advantageous Effects of Disclosure

An image processing apparatus according to an embodiment of the disclosure may generate an output image with improved details by generating the details of a region of an input image where details are lost or degraded. Accordingly, details of the entire image may become uniform, and the quality of an image may be improved.

An image processing apparatus according to an embodiment of the disclosure may improve the details of an image without greatly increasing hardware complexity.

BEST MODE

Figure 1:
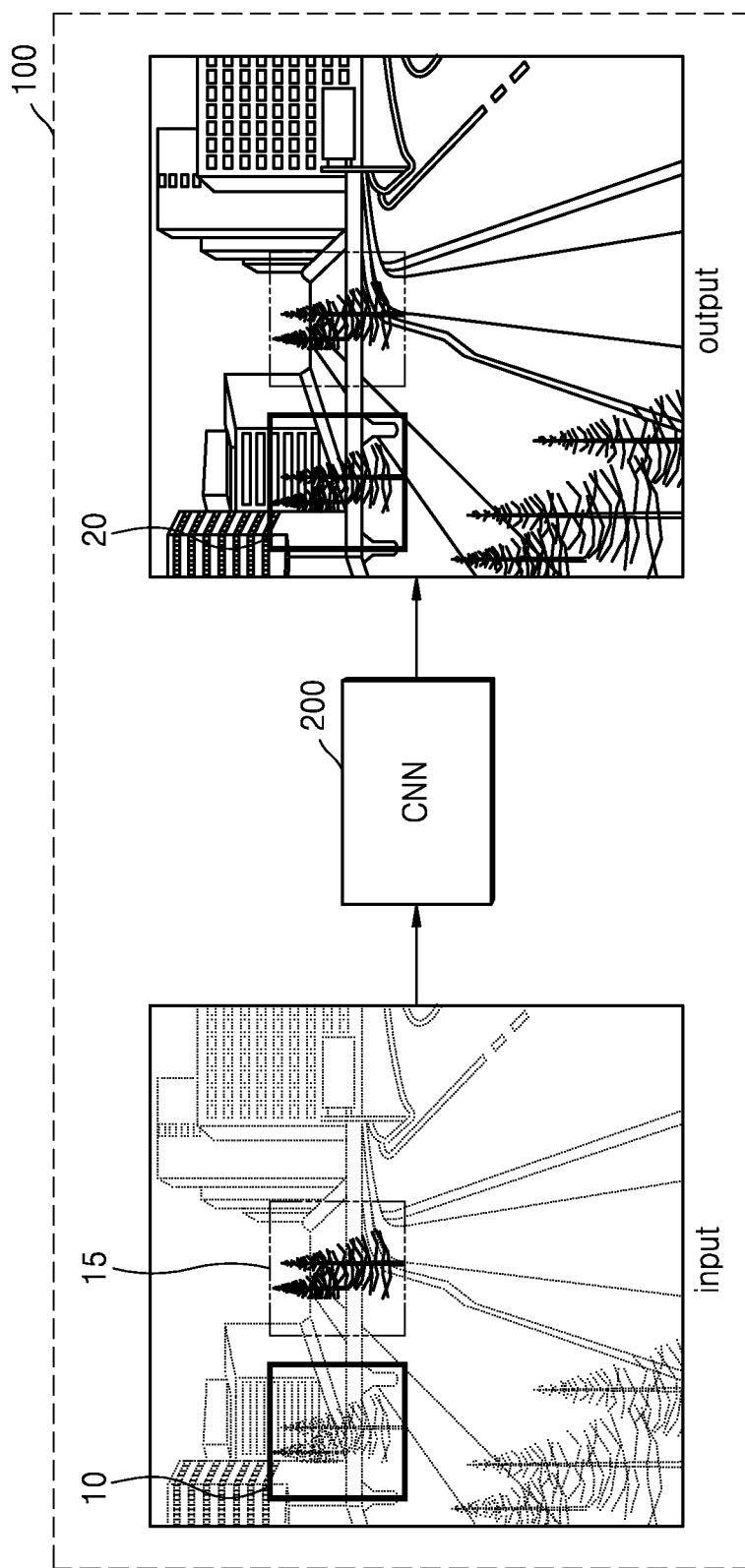
FIG. 1 illustrates a method, performed by an image display apparatus according to an embodiment of the disclosure, of generating an image by using a convolution operation.

According to an aspect of the disclosure, an image processing apparatus includes a memory storing one or more instructions, and a processor configured to execute the one or more instructions stored in the memory. The processor is configured to, by using one or more convolution neural networks, extract target features by performing a convolution operation between features of target regions having same locations in a plurality of input images and a first kernel set, extract peripheral features by performing a convolution operation between features of peripheral regions located around the target regions in the plurality of input images and a second kernel set, and determine a feature of a region in an output image, corresponding to the target regions, based on the target features and the peripheral features.

The plurality of input images may include a first input image and a second input image. The target regions may include a first target region and a second target region having same locations in the first input image and the second input image, respectively. The peripheral regions may include a first peripheral region located around the first target region in the first input image and a second peripheral region located around the second target region in the second input image.

The processor may be further configured to extract the first peripheral region in a range where a distance from the first target region is within a preset distance, from the first input image, and extract the second peripheral region in a range where a distance from the second target region is within the preset distance, from the second input image.

The processor may be further configured to determine a feature similarity between each of a plurality of regions included in the first input image and the first target region, determine the first peripheral region, based on the feature similarity, determine a feature similarity between each of a plurality of regions included in the second input image and the second target region, and determine the second peripheral region, based on the feature similarity.

The first peripheral region may be a region having a feature most similar to a feature of the first target region from among the plurality of regions included in the first input image, and the second peripheral region may be a region having a feature most similar to a feature of the second target region from among the plurality of regions included in the second input image.

The processor may be further configured to determine a first weight that is applied to the first peripheral region, based on a distance between the first target region and the first peripheral region, determine a second weight that is applied to the second peripheral region, based on a distance between the second target region and the second peripheral region, and extract the peripheral features by applying the first weight and the second weight.

The processor may be further configured to determine the first weight as a larger value as the first target region and the first peripheral region are closer to each other, and determine the second weight as a larger value as the second target region and the second peripheral region are closer to each other.

The processor may be further configured to determine a first weight that is applied to the first peripheral region, based on a first similarity between a feature of the first target region and a feature of the first peripheral region, determine a second weight that is applied to the second peripheral region, based on a second similarity between a feature of the second target region and a feature of the second peripheral region, and extract the peripheral features by applying the first weight and the second weight.

The processor may be further configured to determine the first weight as a larger value as the first similarity is larger, and determine the second weight as a larger value as the second similarity is larger.

Each of the first kernel set and the second kernel set may include a plurality of kernels, and the number of kernels may be equal to the number of input images.

The first kernel set may include a first kernel and a second kernel, the second kernel set may include a third kernel and a fourth kernel. The processor may be further configured to extract a first target feature by performing a convolution operation of the first target region and the first kernel, extract a second target feature by performing a convolution operation of the second target region and the second kernel, extract a first peripheral feature by performing a convolution operation of the first peripheral region and the third kernel, extract a second peripheral feature by performing a convolution operation of the second peripheral region and the fourth kernel, and determine features of regions corresponding to the first target region and the second target region in the output image, based on the first target feature, the second target feature, the first peripheral feature, and the second peripheral feature.

The processor may determine a feature of a region in the output image, corresponding to the target regions, by performing a convolution operation of the target features, the peripheral features, and the third kernel.

The plurality of input images may include at least one of a plurality of frame images and a plurality of feature maps, which is input to one of a plurality of convolution layers included in the one or more convolution neural networks.

According to an aspect of the disclosure, an operation method of an image processing apparatus includes extracting target features by performing a convolution operation between features of target regions having same locations in a plurality of input images and a first kernel set, extracting peripheral features by performing a convolution operation between features of peripheral regions located around the target regions in the plurality of input images and a second kernel set, and determining a feature of a region in an output image, corresponding to the target regions, based on the target features and the peripheral features.

According to an aspect of the disclosure, a computer program product includes a non-transitory computer-readable recording medium having recorded thereon a program that enables to extract target features by performing a convolution operation of features of target regions having same locations in a plurality of input images and a first kernel set, extracting peripheral features by performing a convolution operation of features of peripheral regions located around the target regions in the plurality of input images and a second kernel set, and determine a feature of a region in an output image, corresponding to the target regions, based on the target features and the peripheral features.

MODE OF DISCLOSURE

Hereinafter, the terms used in the specification will be briefly described, and then the disclosure will be described in detail.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the embodiments set forth herein. In the drawings, parts irrelevant to the description are omitted for simplicity of explanation, and like numbers refer to like elements throughout.

FIG. 1 illustrates a method, performed by an image display apparatus 100 according to an embodiment of the disclosure, of generating an image by using a convolution operation.

Referring to FIG. 1, the image processing apparatus 100 may receive a first image (input) and process the first image (input) by using a convolution neural network (CNN) 200 to generate a second image (output). The image processing apparatus 100 may extract feature information about the first image (input) and generate the second image (output) based on the extracted feature information, by using the CNN 200.

The CNN 200 may include one or more convolution layers. In each of the convolution layers, a convolution operation of one or more images (or feature maps) and a kernel may be performed, and one or more images (or feature maps) generated as a result of the convolution operation may be output. One or more feature maps output by a current convolution layer may be input to a next convolution layer.

The image processing apparatus 100 according to an embodiment may improve details of a first region 20 by extracting not only feature information of the target region 10 but also feature information of a peripheral region 15 located around the target region 10, which correspond to a region 20 (first region) of which feature information is desired to be extracted. For example, details of the target region 10 in the first image (input) are lost or degraded, the image processing apparatus 100 may improve the details of the first region 20 corresponding to the target region 10 by generating the second image (output) by using detail information of the peripheral region 15 located around the target region 10 together with detail information of the target region 10.

A method, performed by an image processing apparatus according to an embodiment, of extracting feature information about the first region 20 by using the target region 10 and the peripheral region 15 will be described in more detail with reference to the drawings to be described below.

Figure 2:
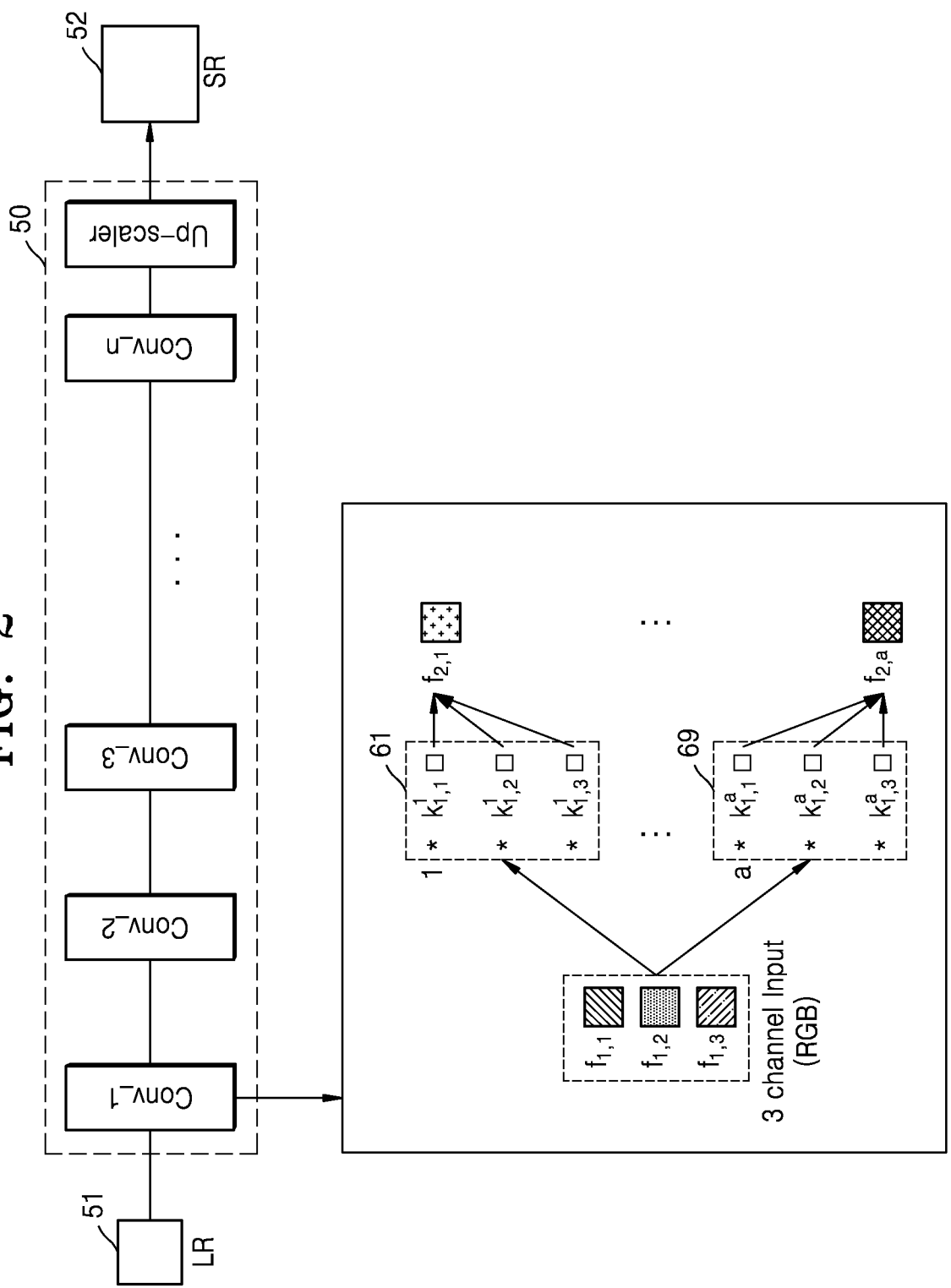
FIGS. 2 and 3 are diagrams for describing a process in which a convolution operation is performed in a general convolution neural network (CNN).
Figure 3:
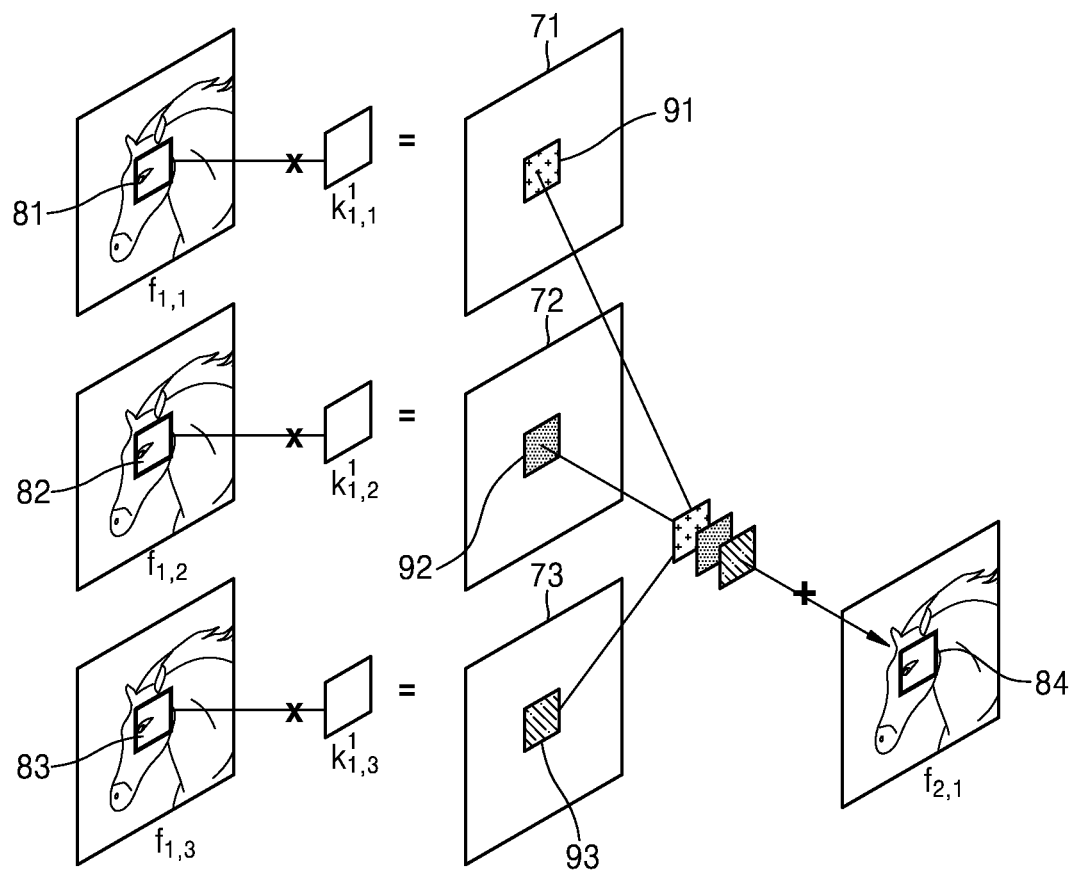

FIGS. 2 and 3 are diagrams used to describe a process in which a convolution operation is performed in a general CNN.

Referring to FIG. 2, a CNN 50 may include a plurality of convolution layers. For example, the plurality of convolution layers may include first through n-th convolution layers (Conv_1, Conv_2, Conv_3, through to Conv_n). An input image 51 input to the CNN 50 of FIG. 2 is a low-resolution image, and an output image 52 may be a high-resolution image, and accordingly, the CNN 50 may further include an up-scaler, but embodiments of the disclosure are not limited thereto.

Values (for example, feature maps) output from the first convolution layer (Conv_1) may be input to the second convolution layer (Conv_2), and values output from the second convolution layer (Conv_2) may be input to the third convolution layer (Conv_3).

Referring to FIG. 2, the input image 51 may be an image including R, G, and B channels RGB 3CH, and thus, three images $f_{1,1}$, $f_{1,2}$, and $f_{1,3}$ may be input to the first convolution layer Conv_1. The first convolution layer Conv_1 may include a kernel sets. In this case, the number of kernels included in each of the kernel sets may be equal to the number of images input to the first convolution layer Conv_1. For example, as shown in FIG. 2, when the three images $f_{1,1}$, $f_{1,2}$, and $f_{1,3}$ are input to the first convolution layer Conv_1, the number of kernels included in a kernel set of the first convolution layer Conv_1 may be three.

In the first convolution layer Conv_1, a convolution operation of the input images $f_{1,1}$, $f_{1,2}$, and $f_{1,3}$ and a kernel sets 61, ..., 69 may be performed, and thus a feature maps $f_{2,1}$, ..., $f_{2,a}$ may be extracted. For example, a convolution operation of the input images $f_{1,1}$, $f_{1,2}$, and $f_{1,3}$ and the first kernel set 61 may be performed, and thus the first feature map $f_{2,1}$ may be extracted. A convolution operation of the input images $f_{1,1}$, $f_{1,2}$, and $f_{1,3}$ and the a-th kernel set 69 may be performed, and thus the a-th feature map $f_{2,a}$ may be extracted.

A method of extracting the first feature map $f_{2,1}$ will now be described in detail with reference to FIG. 3.

Referring to FIG. 3, the input images may include first through third input images $f_{1,1}$, $f_{1,2}$, and $f_{1,3}$, and a first kernel set may include first through third kernels $k^1_{1,1}$, $k^1_{1,2}$, and $k^1_{1,3}$. A first sub-feature map 71 may be extracted by performing a convolution operation of the first input image $f_{1,1}$ and the first kernel $k^1_{1,1}$. In this case, the first sub-feature map 71 may include a first target feature 91 corresponding to a first target region 81 of the first input image $f_{1,1}$. A second sub-feature map 72 may be extracted by performing a convolution operation of the second input image $f_{1,2}$ and the second kernel $k^1_{1,2}$. In this case, the second sub-feature map 72 may include a second target feature 92 corresponding to a second target region 82 of the second input image $f_{1,2}$. A third sub-feature map 73 may be extracted by performing a convolution operation of the third input image $f_{1,3}$ and the third kernel $k^1_{1,3}$. In this case, the third sub-feature map 73 may include a third target feature 93 corresponding to a third target region 83 of the third input image $f_{1,3}$. The first through third target regions 81, 82, and 83 have the same locations on the first through third input images $f_{1,1}$, $f_{1,2}$, and $f_{1,3}$.

The first feature map $f_{2,1}$ may be extracted by summing the first through third sub-feature maps 71, 72, and 73, and a feature of a specific region 84 corresponding to the first through third target regions in the first feature map $f_{2,1}$ may be determined by summing the first through third target features 91, 92, and 93.

In a general convolution operation, a feature of a specific region in an output image (or an output feature map) is determined based on the feature of a target region having a location corresponding to the specific region in an input image (or an input feature map). Accordingly, when details of the target region in the input image are lost or degraded due to a compression artifact, motion blur, or the like, details of the specific region of the output image may also be lost or degraded.

The image processing apparatus 100 according to an embodiment may determine the feature of the specific region by taking into account not only the feature of the target region in the input image but also the feature of a peripheral region located around the target region, thereby generating or improving the details of the specific region.

Figure 4:
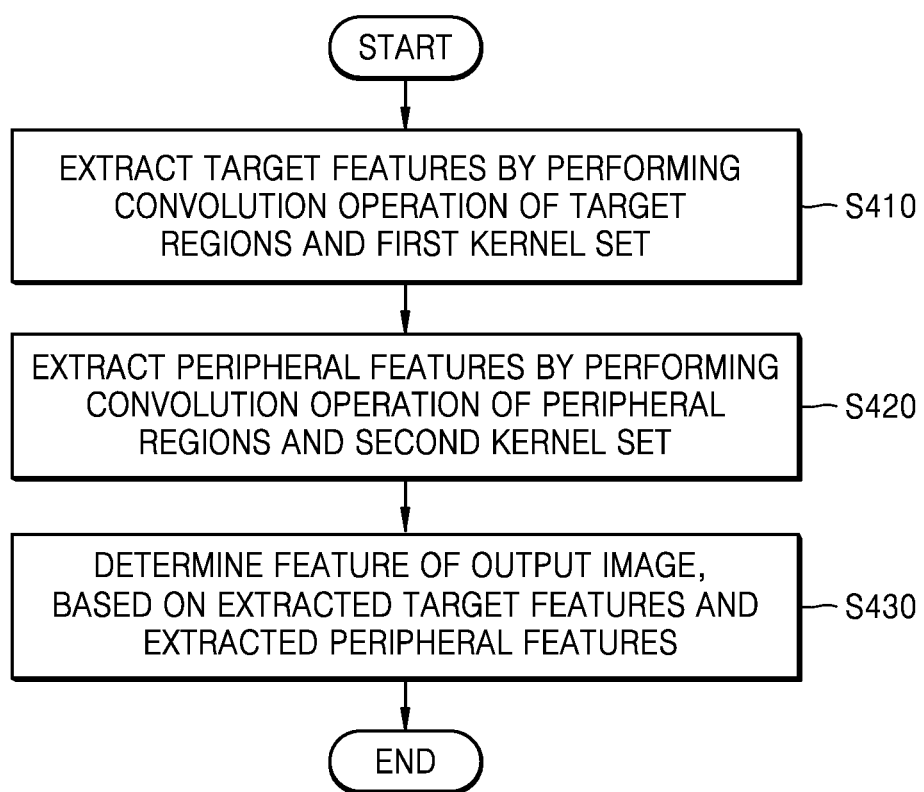
FIG. 4 is a flowchart of an operation method of the image processing apparatus according to an embodiment of the disclosure.

FIG. 4 is a flowchart of an operation method of the image processing apparatus 100 according to an embodiment of the disclosure.

Referring to FIG. 4, the image processing apparatus 100 according to an embodiment may extract target features by performing a convolution operation between the features of target regions having the same locations in a plurality of input images and a first kernel set (S410).

The image processing apparatus 100 may extract the target regions having the same locations in the plurality of input images. The target regions may refer to regions corresponding to one region on the output image (output feature map) of which feature information is desired to be obtained.

The image processing apparatus 100 may extract the target features by performing a convolution operation of the extracted target regions and the first kernel set. For example, the number of kernels included in the first kernel set may be equal to the number of input images, and the image processing apparatus 100 may calculate the target features by performing a convolution between each of the target regions included in the plurality of input images and each of the kernels included in the first kernel set.

The image processing apparatus 100 may extract peripheral features by performing a convolution operation between the features of peripheral regions located around the target regions and a second kernel set (S420).

The image processing apparatus 100 may extract an arbitrary region from among a plurality of regions located around the target region in each of the plurality of input images, as the peripheral region in each of the plurality of input images. Alternatively, the image processing apparatus 100 may extract the peripheral region, based on a feature similarity between the plurality of regions and the target region, and may extract, as the peripheral region, a region having a largest feature similarity to the target region from among the plurality of regions. This will be described in greater detail later with reference to FIG. 8.

The image processing apparatus 100 may apply a weight to the extracted peripheral region. For example, the image processing apparatus 100 may apply a weight determined based on a distance between the target region and the peripheral region to the peripheral region, or may apply the determined weight to the peripheral region, based on a feature similarity between the target region and the peripheral region. This will be described in greater detail later with reference to FIG. 9.

The image processing apparatus 100 may extract the peripheral features by performing a convolution operation of the peripheral regions and the second kernel set. For example, the number of kernels included in the second kernel set may be equal to the number of input images, and the image processing apparatus 100 may calculate the target features by performing convolution between each of the peripheral regions included in the input images and each of the kernels included in the second kernel set.

The image processing apparatus 100 may determine a feature (output feature information) of the output image corresponding to the target region, based on the extracted target features and the extracted peripheral features. For example, the image processing apparatus 100 may determine feature information about one region of the output image corresponding to the target regions, by performing a convolution operation of the target features and the peripheral features and the kernels.

Figure 5:
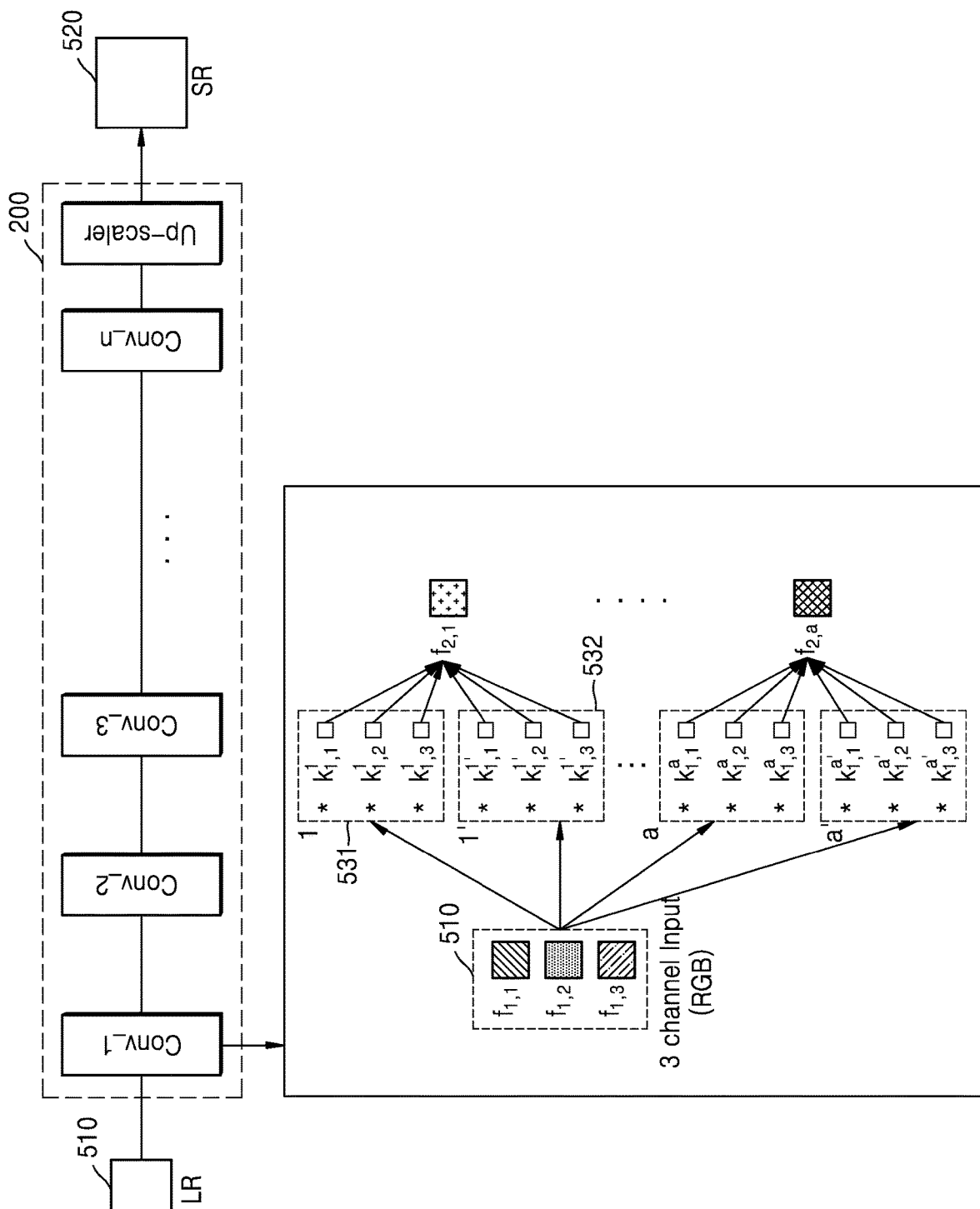
FIGS. 5 through 7 are diagrams for describing a process in which an image display apparatus according to an embodiment of the disclosure processes an image by using a CNN.
Figure 6:
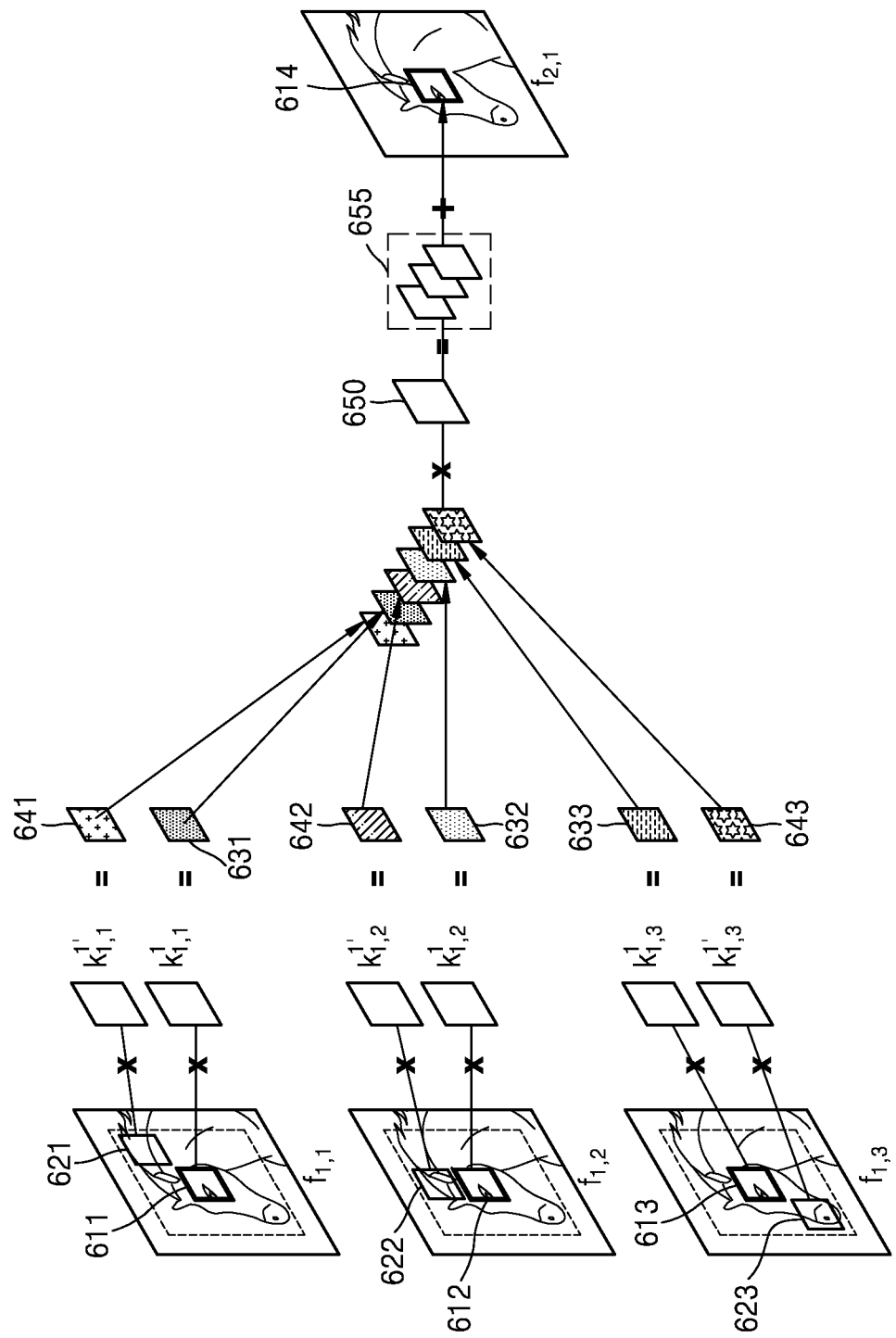
Figure 7:
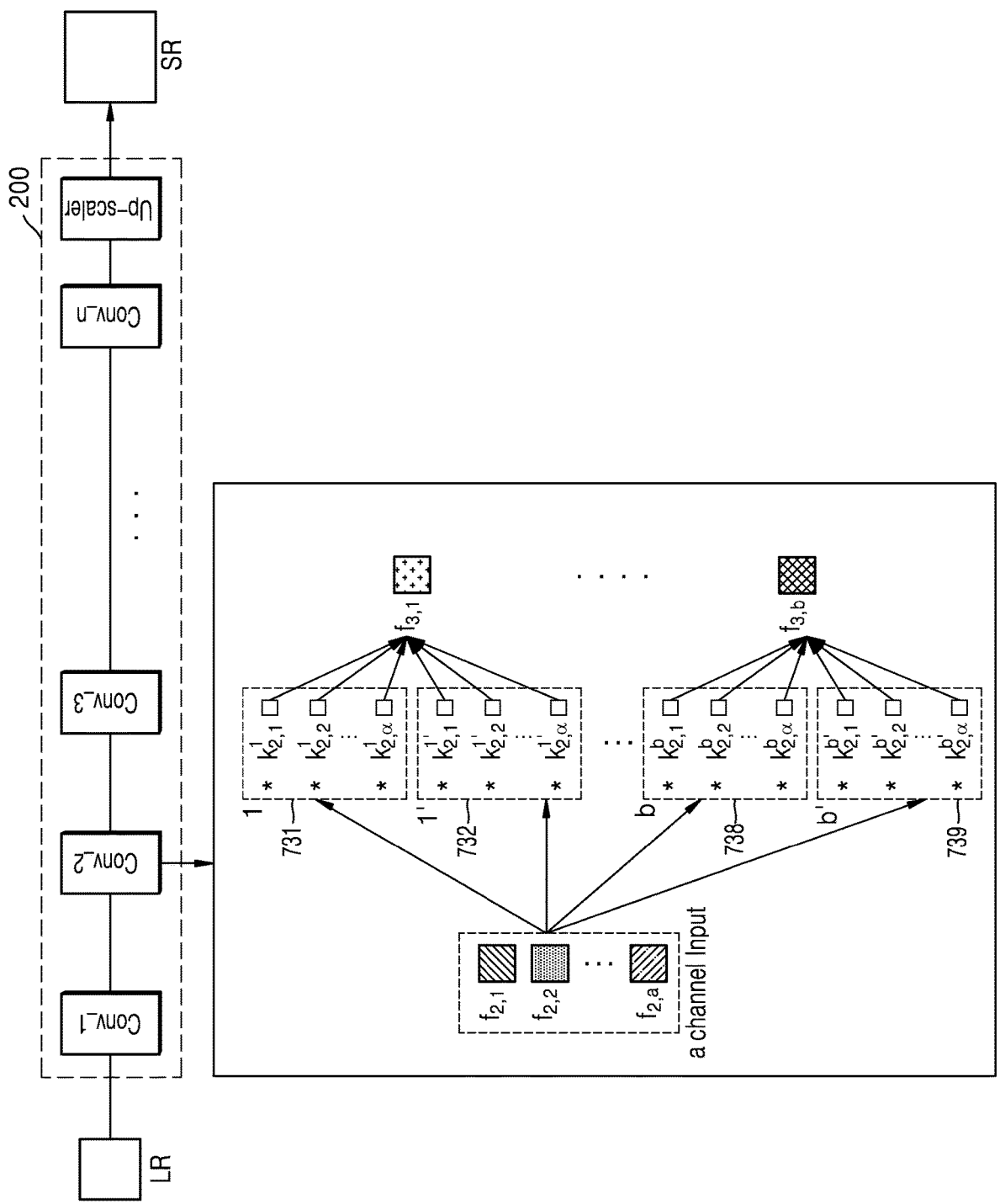

FIGS. 5 through 7 are diagrams used to describe a process in which an image display apparatus according to an embodiment of the disclosure processes an image by using a CNN.

Referring to FIG. 5, the image processing apparatus 100 may perform a convolution operation by using a CNN 200. The CNN 200 may include a plurality of convolution layers. For example, the plurality of convolution layers may include first through n-th convolution layers (Conv_1, Conv_2, Conv_3, through to Conv_n).

Referring to FIG. 5, an input image 510 may be an image including R, G, and B channels, and thus, three images may be input to the first convolution layer Conv_1. Alternatively, frame images having a plurality of time points (for example, a frame image of a time point (t−1), a frame image of a time point t, and a frame image of a time point (t+1)) may be input to the first convolution layer Conv_1.

The first convolution layer may include 2a kernel sets. In this case, the number of kernels included in each of the kernel sets may be equal to the number of images input to the first convolution layer Conv_1. For example, as shown in FIG. 5, three kernels may be included in each kernel set of the first convolution layer Conv_1.

In the first convolution layer Conv_1, feature maps may be extracted by performing a convolution operation of the input images $f_{1,1}$, $f_{1,2}$, and $f_{1,3}$ and the kernel sets. For example, target features may be extracted by performing a convolution operation of the input images $f_{1,1}$, $f_{1,2}$, and $f_{1,3}$ and a first kernel set 531, and peripheral features may be extracted by performing a convolution operation of the input images $f_{1,1}$, $f_{1,2}$, and $f_{1,3}$ and a second kernel set 532. A first feature map $f_{2,1}$ may be generated based on the extracted target features and the extracted peripheral features.

A method of generating the first feature map $f_{2,1}$ will now be described in detail with reference to FIG. 6.

Referring to FIG. 6, the input images may include the first through third input images $f_{1,1}$, $f_{1,2}$, and $f_{1,3}$. The first kernel set 531 included in the first convolution layer Conv_1 may include first through third kernels $k^1_{1,1}$, $k^1_{1,2}$, and $k^1_{1,3}$, and the second kernel set 532 may include fourth through sixth kernels $k^{1'}_{1,1}$, $k^{1'}_{1,2}$, and $k^{1'}_{1,3}$.

The image processing apparatus 100 may extract target regions 611, 612, and 613 having the same locations in the first through third input images $f_{1,1}$, $f_{1,2}$, and $f_{1,3}$. In this case, the target regions 611, 612, and 613 may be regions corresponding to a region 614 of which feature information is desired to be obtained, in the first feature map.

For example, the first target region 611 included in the first input image $f_{1,1}$, the second target region 612 included in the second input image $f_{1,2}$, the third target region 613 included in the third input image $f_{1,3}$, and the region 614 (hereinafter, referred to as a fourth region) of which feature information is desired to be obtained in the first feature map $f_{2,1}$ may be regions having the same locations in the first through third input images $f_{1,1}$, $f_{1,2}$, and $f_{1,3}$ and the first feature map $f_{2,1}$.

The first through third target regions 611, 612, and 613 and the fourth region 614 of which feature information is desired to be obtained may have the same sizes.

The image processing apparatus 100 may extract target features by performing a convolution operation of the first through third target regions 611, 612, and 613 and the first kernel set 531. For example, the image processing apparatus 100 may extract a first target feature 631 by performing a convolution operation of the first target region 611 and the first kernel $k^1_{1,1}$, may extract a second target feature 632 by performing a convolution operation of the second target region 612 and the second kernel $k^1_{1,2}$, and may extract a third target feature 633 by performing a convolution operation of the third target region 613 and the third kernel $k^1_{1,3}$.

The image processing apparatus 100 may extract peripheral regions located around the target regions 611, 612, and 613 from the first through third input images $f_{1,1}$, $f_{1,2}$, and $f_{1,3}$. A method of extracting the peripheral regions will be described in detail later with reference to FIG. 8.

For example, the image processing apparatus 100 may extract a first peripheral region 621 located around the first target region 611 from the first input image $f_{1,1}$, may extract a second peripheral region 622 located around the second target region 612 from the second input image $f_{1,2}$, and may extract a third peripheral region 623 located around the third target region 613 from the third input image $f_{1,3}$.

The image processing apparatus 100 may extract peripheral features by performing a convolution operation of the first through third peripheral regions 621, 622, and 623 and the second kernel set 532. For example, the image processing apparatus 100 may extract a first peripheral feature 641 by performing a convolution operation of the first peripheral region 621 and the fourth kernel $k^{1'}_{1,1}$, may extract a second peripheral feature 642 by performing a convolution operation of the second peripheral region 622 and the fifth kernel $k^{1'}_{1,2}$, and may extract a third peripheral feature 643 by performing a convolution operation of the third peripheral region 623 and the sixth kernel $k^{1'}_{1,3}$.

The image processing apparatus 100 may determine a feature of the fourth region 614 included in the first feature map $f_{2,1}$, based on the first through third target features 631, 632, and 633 and the first through third peripheral features 641, 642, and 643. For example, the image processing apparatus 100 may determine a feature of the fourth region 614 by performing convolution operations of the first through third target features 631, 632, and 633 and the first through third peripheral features 641, 642, and 643 and the seventh kernel 650 and summing results of the convolution operations. Three features 655 may be obtained by performing a convolution operation of six features (the first through third target features 631, 632, and 633 and the first through third peripheral features 641, 642, and 643) and the seventh kernel 650, and may be summed to determine the feature of the fourth region 614. However, the disclosure is not limited thereto.

The image processing apparatus 100 may determine features of the other regions of the first feature map $f_{2,1}$ using the same method as the method described with reference to FIG. 6, and thus may generate the first feature map $f_{2,1}$ including feature information.

The image processing apparatus 100 may generate second through a-th feature maps $f_{2,2}, \ldots, f_{2,a}$ by performing a convolution operation on a plurality of input images and the third through 2a-th kernel sets by using the same method as the method described with reference to FIG. 6, in the first convolution layer Conv_1.

Referring to FIG. 7, the a feature maps $f_{2,1}, f_{2,2}, \ldots, f_{2,a}$ output by the first convolution layer Conv_1 may be input to the second convolution layer Conv_2.

The second convolution layer Conv_2 may include 2b kernel sets. In this case, the number of kernels included in each kernel set may be equal to the number of images input to the second convolution layer Conv_2. For example, as shown in FIG. 7, the number of kernels included in each kernel set of the second convolution layer Conv_2 may be a.

The image processing apparatus 100 may extract feature maps $f_{3,1}, f_{3,2}, \ldots, f_{3,b}$ by performing a convolution operation of the a feature maps $f_{2,1}, f_{2,2}, \ldots, f_{2,a}$ and kernel sets 731, 732, . . . , 738, and 739, in the second convolution layer Conv_2. In this case, the image processing apparatus 100 may generate b feature maps $f_{3,1}, f_{3,2}, \ldots, f_{3,b}$ using the same method as the method described with reference to FIG. 6 (method of generating a feature maps in a first convolution layer).

Figure 8:
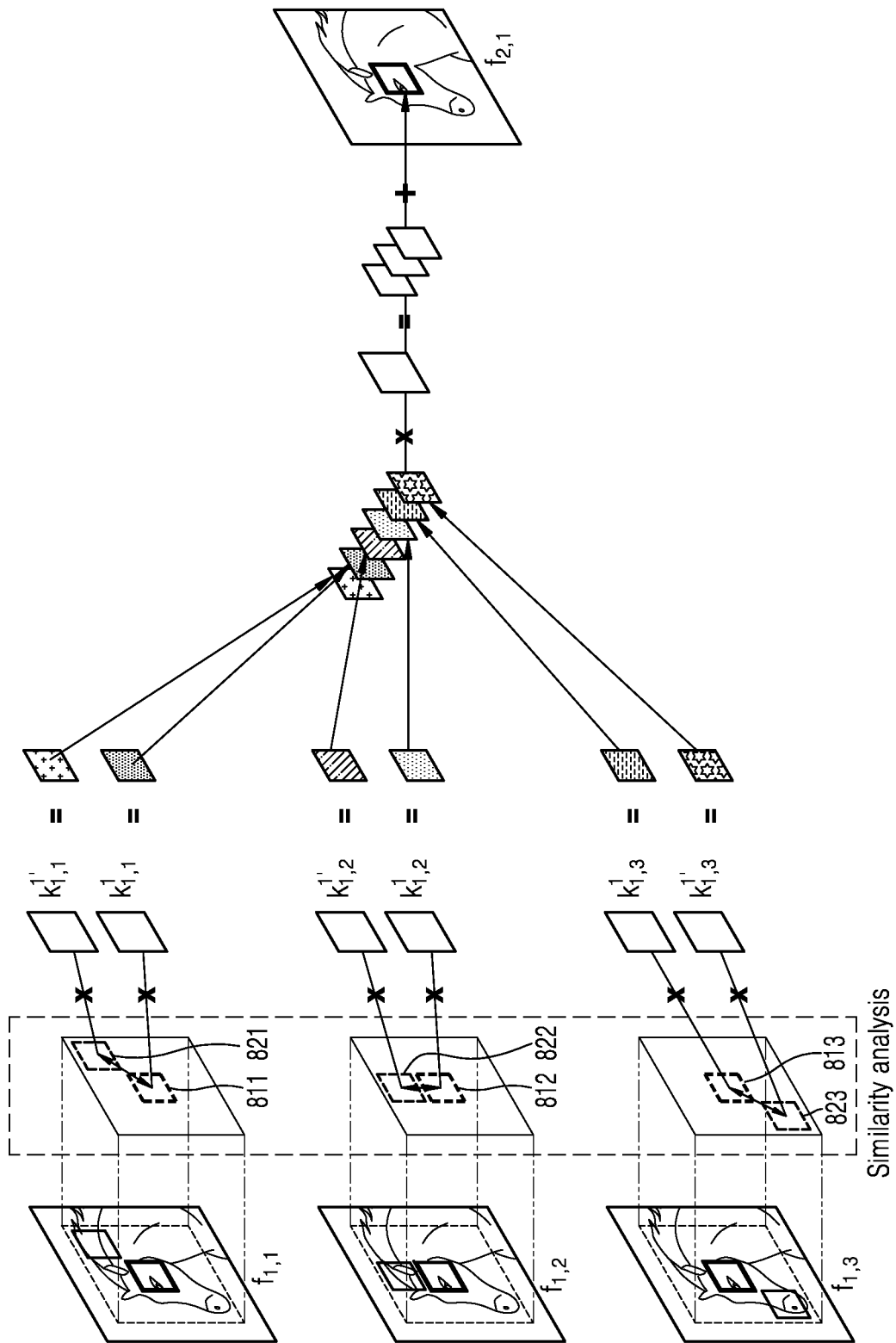
FIG. 8 is a diagram for describing a method, performed by an image processing apparatus according to an embodiment of the disclosure, of extracting a peripheral region.

FIG. 8 is a diagram used to describe a method, performed by an image processing apparatus according to an embodiment of the disclosure, of extracting a peripheral region.

Referring to FIG. 8, the image processing apparatus 100 according to an embodiment may analyze a similarity between features of a plurality of regions included in an input image and a feature of a target region, and may extract the peripheral region, based on the analyzed similarity.

For example, the image processing apparatus 100 may calculate the similarity between the features of the plurality of regions and the feature of the target region, and first through third similarity maps of FIG. 8 may be maps representing a similarity between the target region and the plurality of regions located around the target region in each of the first through third input images.

In this case, the image processing apparatus 100 may calculate a feature similarity f(s), based on a gram matrix function or an L2 norm function. For example, the image processing apparatus 100 may calculate a gram matrix function by using Equations 1 through 3 below, and may determine that, the smaller the value of the gram matrix function is, the larger the feature similarity is.

$$\text{Gram matrix function} = |G_{target} - G_{non-local}| \quad \text{[Equation 1]}$$

$$G_{target,ij} = \sum_k P_{target,ik} P_{target,jk} \quad \text{[Equation 2]}$$

$$G_{non-local,ij} = \sum_k P_{non-local,ik} P_{non-local,jk} \quad \text{[Equation 3]}$$

where $G_{target}$ indicates a gram matrix of the target region, $G_{non-local}$ indicates a gram matrix of each of the plurality of regions located around the target region, $P_{target, ij}$ indicates a pixel value of a location (i j) in the target region, and $P_{non-local, ij}$ indicates a pixel value of a location (i j) in each of the plurality of regions.

The image processing apparatus 100 according to an embodiment may determine that, the smaller the value of the gram matrix function is, the larger the feature similarity is.

The image processing apparatus 100 may calculate an L2 norm function by using Equations 4 through 5 below, and may determine that, the smaller the value of the L2 norm function is, the larger the feature similarity is.

$$L2 \; norm \; \text{function} = \|(P_{target} - P_{non-local})\|_2 \quad \text{[Equation 4]}$$

$$\|(P_{target} - P_{non-local})\|_2 = \left[\sum_{i,j} |P_{target,ij} - P_{non-local,ij}|^2\right]^{1/2} \quad \text{[Equation 5]}$$

Referring to FIG. 8, the image processing apparatus 100 may calculate a feature similarity between a first target region 811 and a plurality of regions located around the first target region 811 in the first input image $f_{1,1}$, and may extract a first peripheral region 821 having a largest feature similarity from among the plurality of regions. The image processing apparatus 100 may calculate a feature similarity between a second target region 812 and a plurality of regions located around the second target region 812 in the second input image $f_{1,2}$, and may extract a second peripheral region 822 having a largest feature similarity from among the plurality of regions. The image processing apparatus 100 may calculate a feature similarity between a third target region 813 and a plurality of regions located around the third target region 813 in the third input image $f_{1,3}$, and may extract a third peripheral region 823 having a largest feature similarity from among the plurality of regions.

The image processing apparatus 100 according to an embodiment may extract peripheral features (first through third peripheral features) by performing a convolution operation of the extracted first through third peripheral regions 821, 822, and 823 and a second kernel set.

Figure 9:
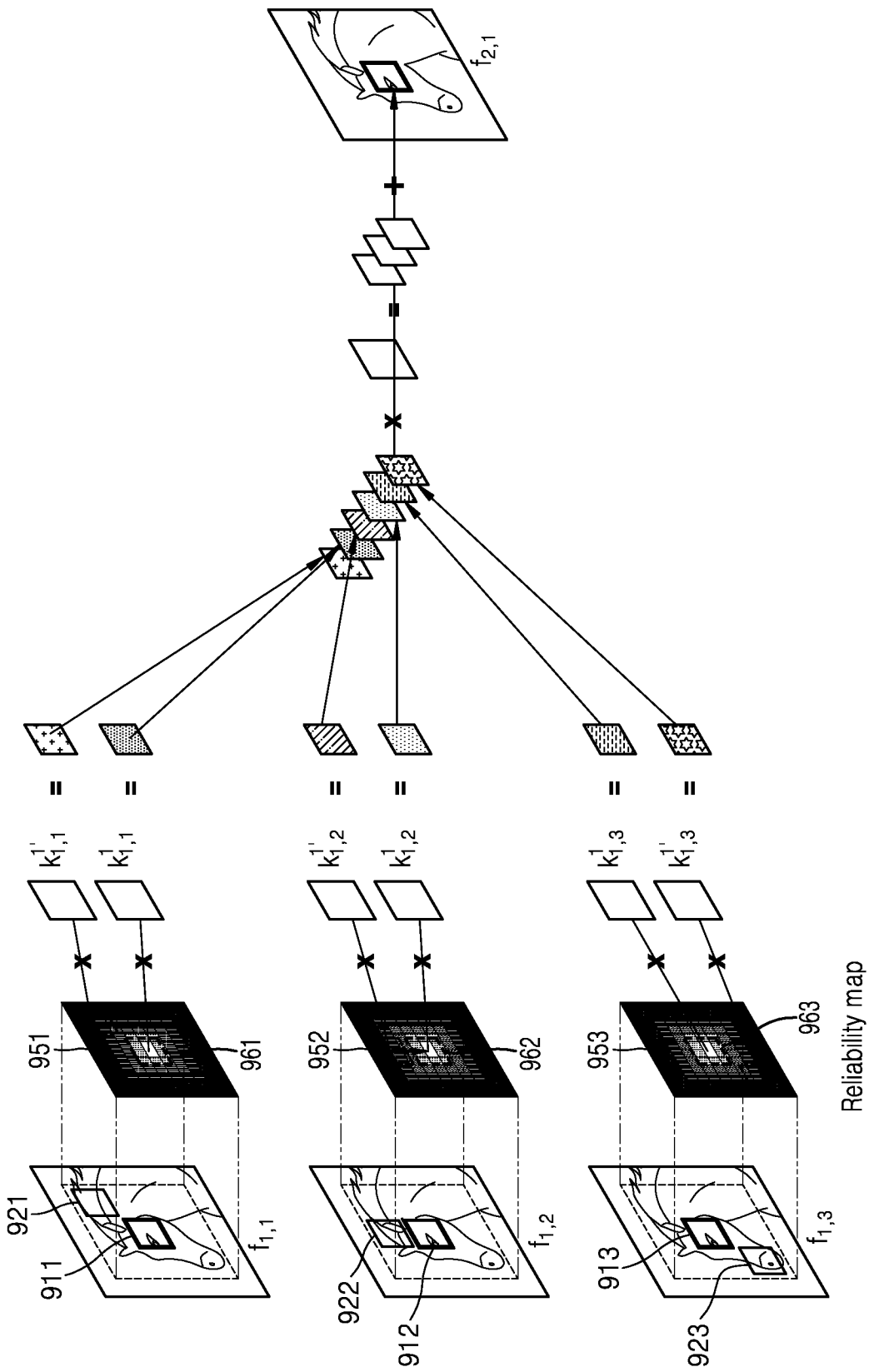
FIG. 9 is a diagram for describing a method, performed by an image processing apparatus according to an embodiment of the disclosure, of applying a weight to a peripheral region.

FIG. 9 is a diagram used to describe a method, performed by an image processing apparatus according to an embodiment of the disclosure, of applying a weight to a peripheral region.

The image processing apparatus 100 may apply a weight to the extracted peripheral region.

Referring to FIG. 9, the image processing apparatus 100 may apply a weight to the peripheral region by using a weight map. For example, the image processing apparatus 100 may apply a weight to a first peripheral region 921 by performing a multiplication operation of the first input image $f_{1,1}$ and a first weight map 951. The image processing apparatus 100 may apply a weight to a second peripheral region 922 by performing a multiplication operation of a second input image $f_{1,2}$ and a second weight map 952, and may apply a weight to a third peripheral region 923 by performing a multiplication operation of the third input image $f_{1,3}$ and a third weight map 953.

The image processing apparatus 100 may determine a weight for the peripheral region, based on a distance between the extracted peripheral region and a target region.

For example, the image processing apparatus 100 may determine a weight for the first peripheral region 921 according to a distance between a first target region 911 and the extracted first peripheral region 921 in the first input image $f_{1,1}$, and may determine the weight as a larger value as the distance decreases ( 가까울수록으로 번역해주세요 ). In the same manner, the image processing apparatus 100 may determine a weight for the second peripheral region 922 according to a distance between a second target region 912 and the extracted second peripheral region 922 in the second input image $f_{1,2}$. The image processing apparatus 100 may determine a weight for the third peripheral region 923 according to a distance between a third target region 913 and the extracted third peripheral region 923 in the third input image $f_{1,3}$.

When the image processing apparatus 100 determines the weight for the peripheral region, based on the distance between the target region and the peripheral region, values included in a weight map according to an embodiment of the disclosure may be determined according to a distance between the target region and regions located around the target region. For example, the weight map may be expressed as Equation 6 below.

$$\text{distance weight} = \frac{C \times f(d)}{\max(f(d))} \quad \text{[Equation 6]}$$

wherein C indicates a constant and f(d) is a function representing a distance between a target region and peripheral regions located around the target region. Examples of the function f(d) may include, but is not limited to, a bi-linear function and a Gaussian function.

For example, the first through third weight maps 951, 952, and 953 may have large values in first through third regions 961, 962, and 963 corresponding to the first through third target regions 911, 912, and 913, and may have shapes of which values decrease in a direction away from the first through third regions 961, 962, and 963, but embodiments of the disclosure are not limited thereto.

The image processing apparatus 100 may determine the weight for the peripheral region, based on a similarity between the extracted peripheral region and the target region.

For example, the image processing apparatus 100 may determine the weight for the first peripheral region 921, based on a feature similarity f(s) between the first target region 911 and the extracted first peripheral region 921 in the first input image $f_{1,1}$, and may determine the weight as a larger value as the feature similarity increases ( 클수록으로 번역해주세요 ). In the same manner, the image processing apparatus 100 may calculate a similarity between the second target region 912 and the extracted second peripheral region 922 in the second input image $f_{1,2}$, and may determine the weight for the second peripheral region 922 according to the calculated similarity. The image processing apparatus 100 may calculate a feature similarity between the third target region 913 and the extracted third peripheral region 923 in the third input image $f_{1,3}$, and may determine the weight for the third peripheral region 923 according to the calculated feature similarity.

In this case, the image processing apparatus 100 may calculate a similarity between the peripheral region and the target region by using the gram matrix function or L2 norm function described above with reference to FIG. 8.

When the image processing apparatus 100 determines the weight for the peripheral region, based on the feature similarity f(s) between the target region and the peripheral region, the weight map may be expressed as Equation 7 below.

$$\text{similarity weight} = \frac{C_1}{f(s) + C_2} \quad \text{[Equation 7]}$$

where $C_1$ and $C_2$ indicate constants and f(s) indicates a feature similarity and may be calculated using the gram matrix function of Equations 1 through 3 or the L2 norm function of Equations 4 and 5, but embodiments are not limited thereto. In this case, the greater the feature similarity is, f(s) is closer to zero.

The first through third weight maps 951, 952, and 953 represent Gaussian functions and are illustrated as the same weight maps. However, embodiments are not limited thereto, and the first through third weight maps 951, 952, and 953 may be different maps.

Figure 10:
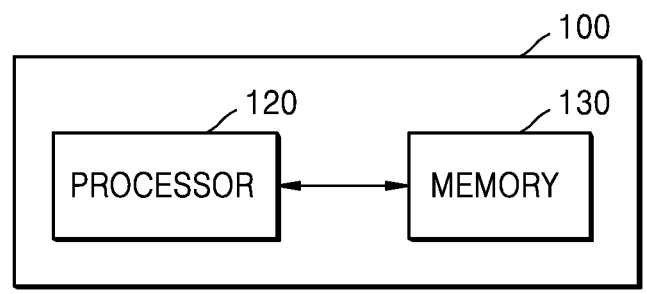
FIG. 10 is a block diagram of a structure of an image processing apparatus according to an embodiment of the disclosure.

FIG. 10 is a block diagram of a structure of an image processing apparatus 100 according to an embodiment of the disclosure.

Referring to FIG. 10, the image processing apparatus 100 according to an embodiment of the disclosure may include a processor 120 and a memory 130.

The processor 120 according to an embodiment of the disclosure may entirely control the image processing apparatus 100. The processor 120 according to an embodiment of the disclosure may execute one or more programs stored in the memory 130.

The memory 130 according to an embodiment of the disclosure may store various pieces of data, programs, or applications for driving and controlling the image processing apparatus 100. A program stored in the memory 130 may include one or more instructions. The program (one or more instructions) or application stored in the memory 130 may be executed by the processor 120.

The processor 120 according to an embodiment of the disclosure may generate an output image by performing a convolution operation of a plurality of input images and a plurality of kernels by using a CNN. For example, the processor 120 may extract target features by performing a convolution operation of target regions included in input images (or input feature maps) and the first kernel set, and may extract peripheral features by performing a convolution operation of peripheral regions located around the target regions and the second kernel set. The processor 120 may determine an output feature of a target region, based on the extracted target features and the extracted peripheral features, This has been described above in detail with reference to FIG. 6, and thus a repeated description thereof will be omitted.

The processor 120 may apply a weight to a peripheral region. For example, the processor 120 may apply a determined weight to the peripheral region, based on a distance between the target region and the peripheral region. Alternatively, the processor 120 may apply a determined weight to the peripheral region, based on a feature similarity between the target region and the peripheral region. This has been described above in detail with reference to FIG. 9, and thus a repeated description thereof will be omitted.

Figure 11:
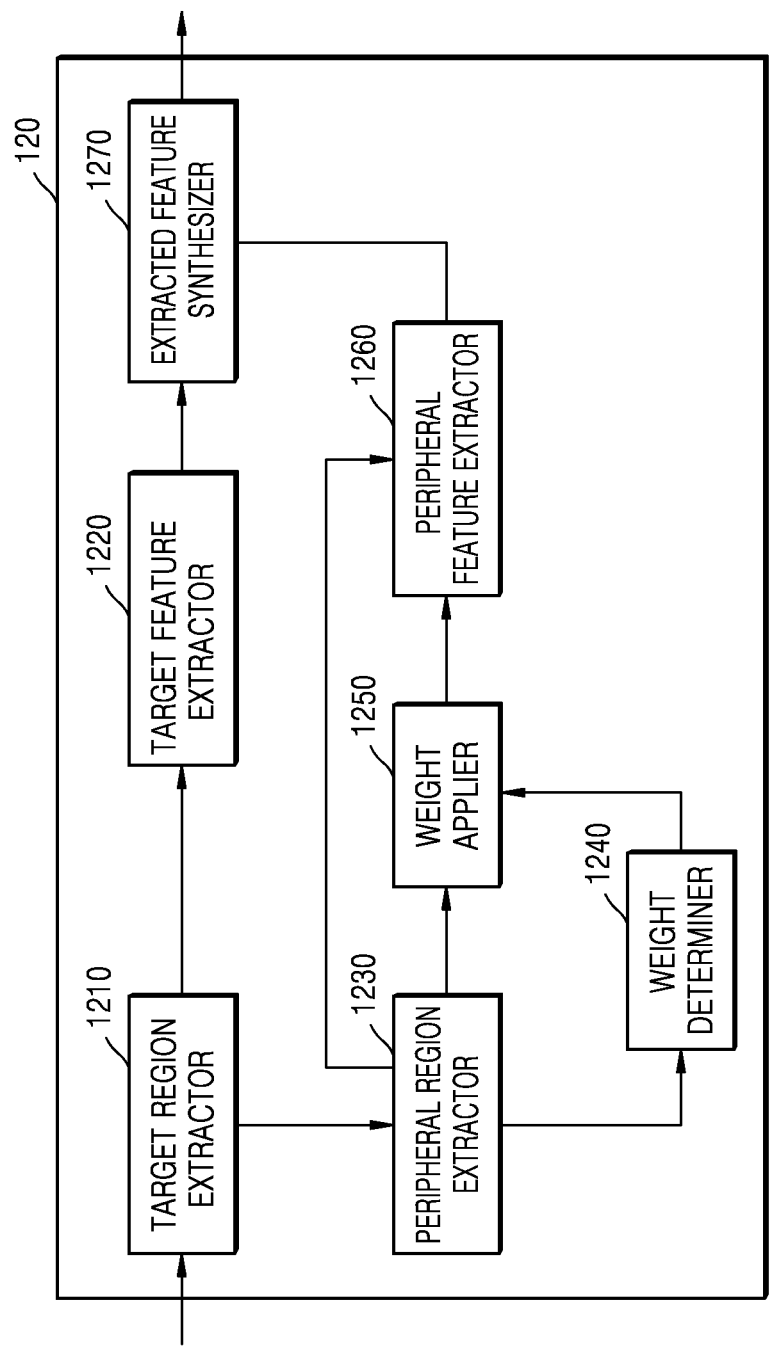
FIG. 11 is a block diagram of a processor according to an embodiment of the disclosure.

FIG. 11 is a block diagram of the processor 120 according to an embodiment of the disclosure.

Referring to FIG. 11, the processor 120 according to an embodiment of the disclosure may include a target region extractor 1210, a target feature extractor 1220, a peripheral region extractor 1230, a weight determiner 1240, a weight applier 1250, a peripheral feature extractor 1260, and an extracted feature synthesizer 1270.

The target region extractor 1210 may extract the target regions having the same locations in the plurality of input images. The target regions may refer to regions corresponding to a region on the output image (output feature map) of which feature information is desired to be obtained.

The target feature extractor 1220 may extract the target features by performing a convolution operation of the extracted target regions and the first kernel set.

The peripheral region extractor 1230 may receive information about the plurality of input images and the target regions, and may extract a peripheral region located around the target region in each of the plurality of input images. The peripheral region extractor 1230 may extract an arbitrary region from among a plurality of regions located around the target region, as the peripheral region. Alternatively, the peripheral region extractor 1230 may extract the peripheral region from among regions located within a preset distance from the target region.

Alternatively, the peripheral region extractor 1230 may extract the peripheral region, based on feature similarities between the plurality of regions included in each of the plurality of input images and the target region. For example, the peripheral region extractor 1230 may calculate the feature similarities between features of the plurality of regions and a feature of the target region, and may extract a region having a largest feature similarity as the peripheral region. At this time, the peripheral region extractor 1230 may calculate the feature similarity by using the gram matrix function or the L2 norm function.

The weight determiner 1240 may determine a weight for the extracted peripheral region. For example, the weight determiner 1240 may determine the weight for the peripheral region, based on a distance between the extracted peripheral region and the target region. At this time, the weight determiner 1240 may generate a weight map of which value is determined based on distances between the target region and the regions located around the target region. For example, the weight determiner 1240 may generate a weight map of which a value is largest in a first region corresponding to the target region and decreases in a direction away from the first region. However, embodiments are not limited thereto.

Alternatively, the weight determiner 1240 may determine the weight for the peripheral region, based on a feature similarity between the peripheral region and the target region. At this time, the weight determiner 1240 may calculate the feature similarity between the peripheral region and the target region by using the gram matrix function or the L2 norm function. The weight determiner 1240 may also generate a weight map of which a value is determined based on the feature similarity.

The weight applier 1250 may apply the weight determined by the weight determiner 1240 to the peripheral region. For example, the weight applier 1250 may apply a weight to the peripheral region by performing a multiplication operation of the peripheral region or the input image and the weight map generated by the weight determiner 1240. However, embodiments are not limited thereto.

The peripheral feature extractor 1260 may extract the peripheral features by performing a convolution operation of the peripheral regions extracted by the peripheral region extractor 1260 or the peripheral regions weight-applied by the weight applier 1250 and the second kernel set.

The extracted feature synthesizer 1270 may determine feature information of the output image (output feature map), based on the target features extracted by the target feature extractor 1220 and the peripheral features extracted by the peripheral feature extractor 1260. For example, the extracted feature synthesizer 1270 may determine the feature of the region corresponding to the target region, by performing a convolution operation of the target features and the peripheral features and a kernel.

At least one of the target region extractor 1210, the target feature extractor 1220, the peripheral region extractor 1230, the weight determiner 1240, the weight applier 1250, the peripheral feature extractor 1260, and the extracted feature synthesizer 1270 of FIG. 11 may be manufactured in the form of a hardware chip and may be mounted on the image processing apparatus 100. For example, at least one of the target region extractor 1210, the target feature extractor 1220, the peripheral region extractor 1230, the weight determiner 1240, the weight applier 1250, the peripheral feature extractor 1260, and the extracted feature synthesizer 1270 may be manufactured in the form of a dedicated hardware chip for AI, or may be manufactured as a portion of an existing general-purpose processor (for example, a central processing unit (CPU) or an application processor (AP)) or a processor dedicated to graphics (for example, a graphics processing unit (GPU)) and may be mounted on any of the aforementioned various image processing apparatuses.

In this case, the target region extractor 1210, the target feature extractor 1220, the peripheral region extractor 1230, the weight determiner 1240, the weight applier 1250, the peripheral feature extractor 1260, and the extracted feature synthesizer 1270 may be mounted on a single image processing apparatus or on separate image processing apparatuses. For example, some of the target region extractor 1210, the target feature extractor 1220, the peripheral region extractor 1230, the weight determiner 1240, the weight applier 1250, the peripheral feature extractor 1260, and the extracted feature synthesizer 1270 may be included in an image processing apparatus, and the others may be included in a server.

At least one of the target region extractor 1210, the target feature extractor 1220, the peripheral region extractor 1230, the weight determiner 1240, the weight applier 1250, the peripheral feature extractor 1260, and the extracted feature synthesizer 1270 may be implemented as a software module. When at least one of the target region extractor 1210, the target feature extractor 1220, the peripheral region extractor 1230, the weight determiner 1240, the weight applier 1250, the peripheral feature extractor 1260, and the extracted feature synthesizer 1270 is implemented as a software module (or a program module including instructions), the software module may be stored in a non-transitory computer-readable recording medium. In this case, the at least one software module may be provided by an operating system (OS) or by a certain application. Alternatively, some of the at least one software module may be provided by an OS and the others may be provided by a certain application.

The block diagrams of the image processing apparatus 100 and the processor 120 of FIGS. 10 and 11 are only exemplary embodiments. Components illustrated in FIGS. 10 and 11 may be combined or omitted according to the specifications of the image processing apparatus 100 when being actually implemented, or additional components may be included in the block diagrams of FIGS. 10 and 11. In other words, two or more components may be combined into a single component, or a single component may be divided into two or more components. A function performed in each block is merely an example to explain embodiments, and a detailed operation or device of each block does not limit the scope of the embodiments.

A method of operating an image processing apparatus according to an embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a RAM, or a flash memory. Examples of the program commands are advanced language codes that can be executed by a computer by using an interpreter or the like as well as machine language codes made by a compiler.

Also, image display apparatuses or operation methods of the image display apparatuses according to the disclosed embodiments may be provided in a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include, in a system including a server and a client device, a storage medium of the server or a storage medium of the client device. Alternatively, if there is a third device (e.g., a smartphone) in communication with the server or client device, the computer program product may include a storage medium of the third device. Alternatively, the computer program product may include the S/W program itself transmitted from the server to the client device or the third device, or transmitted from the third device to the client device.

In this case, one of the server, the client device, and the third device may execute the computer program product to perform the methods according to the disclosed embodiments. Alternatively, at least two of the server, the client device, and the third device may execute the computer program product to distribute and perform the methods according to the disclosed embodiments.

For example, a server (e.g., a cloud server or an artificial intelligence server) may execute a computer program product stored on a server to control a client device communicating with the server to perform the methods according to the disclosed embodiments.

While one or more embodiments of the disclosure have been described with reference to the figures, it will be understood by those of ordinary skill in the art that various changes in form and details may be made therein without departing from the spirit and scope as defined by the following claims.

What is claimed is:

1. An image processing apparatus comprising:
a memory storing one or more instructions; and
a processor configured to execute the one or more instructions stored in the memory,
wherein the processor is configured to, by using one or more convolution neural networks:
extract first features based on features of first regions having same locations in a plurality of input images,
extract second features based on features of peripheral regions located around the first regions in the plurality of input images, and
determine a feature of a region in an output image, corresponding to the first regions, based on the first features and the second features,
wherein the plurality of input images comprise a first input image and a second input image,
wherein the first regions comprise a first region and a second region having same locations in the first input image and the second input image, respectively, and
wherein the peripheral regions comprise a first peripheral region located around the first region in the first input image and a second peripheral region located around the second region in the second input image.

2. The image processing apparatus of claim 1, wherein the processor is further configured to
extract the first peripheral region in a range where a distance from the first region is within a preset distance, from the first input image, and
extract the second peripheral region in a range where a distance from the second region is within the preset distance, from the second input image.

3. The image processing apparatus of claim 1, wherein the processor is further configured to
determine a first feature similarity between each of a plurality of regions included in the first input image and the first region, and determine the first peripheral region based on the first feature similarity, and determine a second feature similarity between each of a plurality of regions included in the second input image and the second region, and determine the second peripheral region based on the second feature similarity.

4. The image processing apparatus of claim 3, wherein the first peripheral region is a region having a feature most similar to a feature of the first region from among the plurality of regions included in the first input image, and the second peripheral region is a region having a feature most similar to a feature of the second region from among the plurality of regions included in the second input image.

5. The image processing apparatus of claim 1, wherein the processor is further configured to determine a first weight that is applied to the first peripheral region, based on a distance between the first region and the first peripheral region, determine a second weight that is applied to the second peripheral region, based on a distance between the second region and the second peripheral region, and extract the second features by applying the first weight and the second weight.

6. The image processing apparatus of claim 5, wherein the processor is further configured to determine the first weight as a larger value as the first region and the first peripheral region are closer to each other, and determine the second weight as the larger value as the second region and the second peripheral region are closer to each other.

7. The image processing apparatus of claim 1, wherein the processor is further configured to determine a first weight that is applied to the first peripheral region, based on a first similarity between a feature of the first region and a feature of the first peripheral region, determine a second weight that is applied to the second peripheral region, based on a second similarity between a feature of the second region and a feature of the second peripheral region, and extract the second features by applying the first weight and the second weight.

8. The image processing apparatus of claim 7, wherein the processor is further configured to determine the first weight as a larger value as the first similarity is larger, and determine the second weight as the larger value as the second similarity is larger.

9. An operation method of an image processing apparatus, the operation method comprising:

extracting first features based on features of first regions having same locations in a plurality of input images;

extracting second features based on features of peripheral regions located around the first regions in the plurality of input images; and determining a feature of a region in an output image, corresponding to the first regions, based on the first features and the second features, wherein the plurality of input images comprise a first input image and a second input image, wherein the first regions comprise a first region and a second region having same locations in the first input image and the second input image, respectively, and wherein the peripheral regions comprise a first peripheral region located around the first region in the first input image and a second peripheral region located around the second region in the second input image.

10. The operation method of claim 9, wherein the extracting of the second features comprises:

extracting the first peripheral region in a range where a distance from the first region is within a preset distance, from the first input image; and extracting the second peripheral region in a range where a distance from the second region is within the preset distance, from the second input image.

11. The operation method of claim 9, wherein the extracting of the second features comprises:

determining a first feature similarity between each of a plurality of regions included in the first input image and the first region, and determining the first peripheral region based on the first feature similarity; and determining a second feature similarity between each of a plurality of regions included in the second input image and the second region, and determining the second peripheral region based on the second feature similarity.

12. The operation method of claim 11, wherein the determining of the first peripheral region comprises determining, as the first peripheral region, a region having a feature most similar to a feature of the first region from among the plurality of regions included in the first input image, and the determining of the second peripheral region comprises determining, as the second peripheral region, a region having a feature most similar to a feature of the second region from among the plurality of regions included in the second input image.

13. The operation method of claim 9, wherein the extracting of the second features comprises:

determining a first weight that is applied to the first peripheral region, based on a distance between the first region and the first peripheral region;

determining a second weight that is applied to the second peripheral region, based on a distance between the second region and the second peripheral region; and extracting the second features by applying the first weight and the second weight.

14. The operation method of claim 13, wherein the determining the first weight comprises determining the first weight as a larger value as the first region and the first peripheral region are closer to each other, and wherein the determining the second weight comprises determining the second weight as the larger value as the second region and the second peripheral region are closer to each other.

15. The operation method of claim 9, further comprising:

determining a first weight that is applied to the first peripheral region, based on a first similarity between a feature of the first region and a feature of the first peripheral region, determining a second weight that is applied to the second peripheral region, based on a second similarity between a feature of the second region and a feature of the second peripheral region, and extracting the second features by applying the first weight and the second weight.

16. The operation method of claim 15, wherein the determining the first weight comprises determining the first weight as a larger value as the first similarity is larger, and wherein the determining the second weight comprises determine the second weight as the larger value as the second similarity is larger.

17. A non-transitory computer-readable recording medium having stored thereon instructions which, when executed by at least one processor of an image processing device, cause the image processing device to:
- extract first features based on features of first regions having same locations in a plurality of input images;
- extract second features based on features of peripheral regions located around the first regions in the plurality of input images; and
- determine a feature of a region in an output image, corresponding to the first regions, based on the first features and the second features,
- wherein the plurality of input images comprise a first input image and a second input image,
- wherein the first regions comprise a first region and a second region having same locations in the first input image and the second input image, respectively, and
- wherein the peripheral regions comprise a first peripheral region located around the first region in the first input image and a second peripheral region located around the second region in the second input image.

* * * * *